(12) United States Patent
Ohno

(10) Patent No.: US 12,285,987 B2
(45) Date of Patent: Apr. 29, 2025

(54) ELECTRIC SUSPENSION APPARATUS AND METHOD FOR CONTROLLING ELECTRIC SUSPENSION

(71) Applicant: HONDA MOTOR CO., LTD., Tokyo (JP)

(72) Inventor: Satoshi Ohno, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/471,305

(22) Filed: Sep. 21, 2023

(65) Prior Publication Data
US 2024/0109388 A1 Apr. 4, 2024

(30) Foreign Application Priority Data
Sep. 30, 2022 (JP) .................. 2022-158593

(51) Int. Cl.
*B60G 17/019* (2006.01)
(52) U.S. Cl.
CPC .. *B60G 17/01933* (2013.01); *B60G 2202/422* (2013.01); *B60G 2400/204* (2013.01); *B60G 2400/25* (2013.01)
(58) Field of Classification Search
CPC ........ B60G 17/01933; B60G 2202/422; B60G 2400/204; B60G 2400/25
See application file for complete search history.

(56) References Cited

U.S. PATENT DOCUMENTS

| 7,871,083 B2 * | 1/2011 | Urababa ............ | B60G 17/0162 |
| | | | 280/5.511 |
| 10,086,669 B2 * | 10/2018 | Takashima ......... | B60G 21/0555 |
| 11,351,833 B2 * | 6/2022 | Toyohira ............ | B60G 17/0165 |
| 11,987,089 B2 * | 5/2024 | Konada ................ | B60G 17/018 |

FOREIGN PATENT DOCUMENTS

| DE | 102017215046 B4 * | 2/2022 | ......... B60G 17/0162 |
| JP | 2625751 B2 * | 7/1997 | |
| JP | 6480202 B2 | 3/2019 | |

* cited by examiner

*Primary Examiner* — Faye M Fleming
(74) *Attorney, Agent, or Firm* — CKC & Partners Co., LLC

(57) ABSTRACT

The electric suspension apparatus is mountable in a vehicle and includes: an electric actuator configured to perform a stroke operation in response to behavior by the vehicle; a motor configured to drive the electric actuator; a rotation angle sensor configured to detect an angle of rotation of the motor; and a controller configured to control the electric actuator, wherein the controller calculates a stroke amount for the electric actuator based on an amount of change in the rotation angle detected by the rotation angle sensor, and controls the electric actuator based on the calculated stroke amount.

9 Claims, 8 Drawing Sheets

ELECTRIC SUSPENSION APPARATUS AND METHOD FOR CONTROLLING ELECTRIC SUSPENSION

This application is based on and claims the benefit of priority from Japanese Patent Application No. 2022-158593, filed on 30 Sep. 2022, the content of which is incorporated herein by reference.

BACKGROUND OF THE INVENTION

Field of the Invention

The present invention pertains to an electric suspension apparatus and a method for controlling an electric suspension.

Related Art

In recent years, there have been greater efforts to provide access to a sustainable transport system that considers people in vulnerable positions, such as elderly persons, disabled persons, or children, from among traffic participants. Towards realizing this, focus is being given to research and development for further improving traffic safety or convenience through development pertaining to the stability of behavior by vehicles.

From a perspective of stability of behavior by vehicles, improving the accuracy of operation by a suspension apparatus mounted in a vehicle is desired. Patent Document 1 discloses a suspension control technique for detecting a position (stroke position, relative position, absolute position) of actuators respectively provided for each wheel of a vehicle, and, based on change of this position, determining a reverse motion anomaly in which an actuator operates so as to cause the vehicle body to vibrate.

Patent Document 1: Japanese Patent No. 6480202

SUMMARY OF THE INVENTION

In order to address improving the stability of behavior by a vehicle, there are demands to improve measurement accuracy while simplifying a system configuration when detecting the position of an actuator in an electric suspension.

An object of the present invention is to provide an electric suspension apparatus and a method for controlling an electric suspension that are capable of improving the accuracy of measuring the position of an electric actuator while simplifying or streamlining a system configuration. An object is consequently to contribute to the development of a sustainable transport system.

(1) An electric suspension apparatus according to the present invention is an electric suspension apparatus (for example, an electric suspension apparatus 10 described below) that is mountable in a vehicle (for example, a vehicle 1 described below) and includes: an electric actuator (for example, an electric actuator 12 described below) configured to perform a stroke operation in response to behavior by the vehicle; a motor (for example, a motor 13 described below) configured to drive the electric actuator; a rotation angle sensor (for example, a resolver S1 described below) configured to detect an angle of rotation of the motor; and a controller (for example, a controller 20 described below) configured to control the electric actuator, the controller calculating a stroke amount for the electric actuator based on an amount of change in the rotation angle detected by the rotation angle sensor, and controlling the electric actuator based on the calculated stroke amount.

(2) In the electric suspension apparatus according to (1) above, the controller may, during activation of the electric suspension apparatus, set the stroke amount for the electric actuator to a fixed initial value.

(3) In the electric suspension apparatus according to (1) above, the controller may, during activation of the electric suspension apparatus, set the stroke amount for the electric actuator to a value from when the electric suspension apparatus previously shut down.

(4) It may be that the electric suspension apparatus according to any one of (1) through (3) above further includes a vibration detection sensor (for example, the resolver S1, a sprung G sensor S2, a vehicle body roll rate sensor S3, a vehicle body pitch rate sensor S4, and a vehicle speed sensor S5 which are described below) configured to detect vibration of the vehicle, and the controller, in a case of determining that there is no vibration of the vehicle based on a detection result from the vibration detection sensor, sets the stroke amount for the electric actuator to a fixed value.

(5) In the electric suspension apparatus according to (4) above, the controller may, in a case of determining over a predetermined number of times or a predetermined amount of time that there is no vibration of the vehicle based on a detection result from the vibration detection sensor, set the stroke amount for the electric actuator to the fixed value.

(6) In the electric suspension apparatus according to any one of (1) through (5) above, the controller may, in a case where the calculated stroke amount is greater than a predetermined upper limit (for example, an upper-limit threshold $X_{Hi}$ described below) or is less than a predetermined lower limit (for example, a lower-limit threshold $X_{Lo}$ described below), stop control of the electric actuator.

(7) In the electric suspension apparatus according to (6) above, it may be that the electric actuator is provided on each of a plurality of the wheels belonging to the vehicle, and the controller, in a case where, from among a plurality of the electric actuators, the stroke amount for the electric actuator corresponding to one of the wheels is greater than the predetermined upper limit or is less than the predetermined lower limit, stops control of the electric actuator corresponding to the wheel adjacent to the one of the wheels or stops control of the electric actuators corresponding to all of the wheels.

(8) In the electric suspension apparatus according to (6) or (7) above, the controller may output a signal for limiting a vehicle speed in a case where the stroke amount for the electric actuator is greater than the predetermined upper limit or is less than the predetermined lower limit.

(9) A method that is for controlling an electric suspension and is according to the present invention is a method for controlling an electric suspension provided with an electric actuator 12 (for example, the electric actuator 12 described below) that is mountable in a vehicle (for example, the vehicle 1 described below) and is configured to perform a stroke operation in response to behavior by the vehicle, the method including: calculating a stroke amount for the electric actuator based on an amount of change in the rotation angle detected by the rotation angle sensor (for example, the resolver S1 described below) for detecting an angle of rotation of a motor (for example, the motor 13 described below) that drives the electric actuator, and controlling the electric actuator based on the calculated stroke amount.

By virtue of the present invention, it is possible to provide an electric suspension apparatus and a method for controlling an electric suspension that are capable of improving the accuracy of measuring the position of an electric actuator while simplifying or streamlining a system configuration.

DETAILED DESCRIPTION OF THE INVENTION

Figure 1:
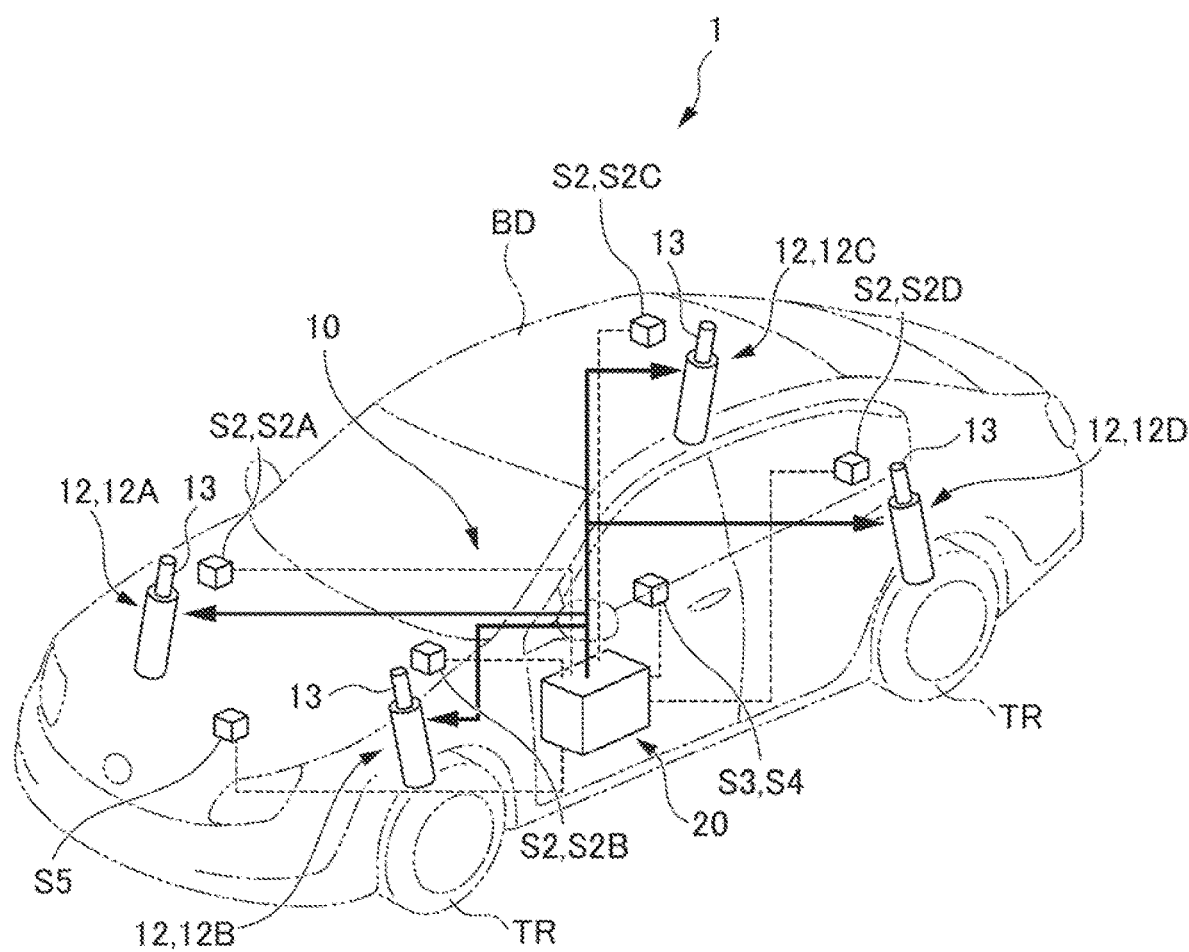
FIG. 1 is a view of a configuration of a vehicle in which an electric suspension apparatus according to an embodiment of the present invention is mounted.
Figure 2:
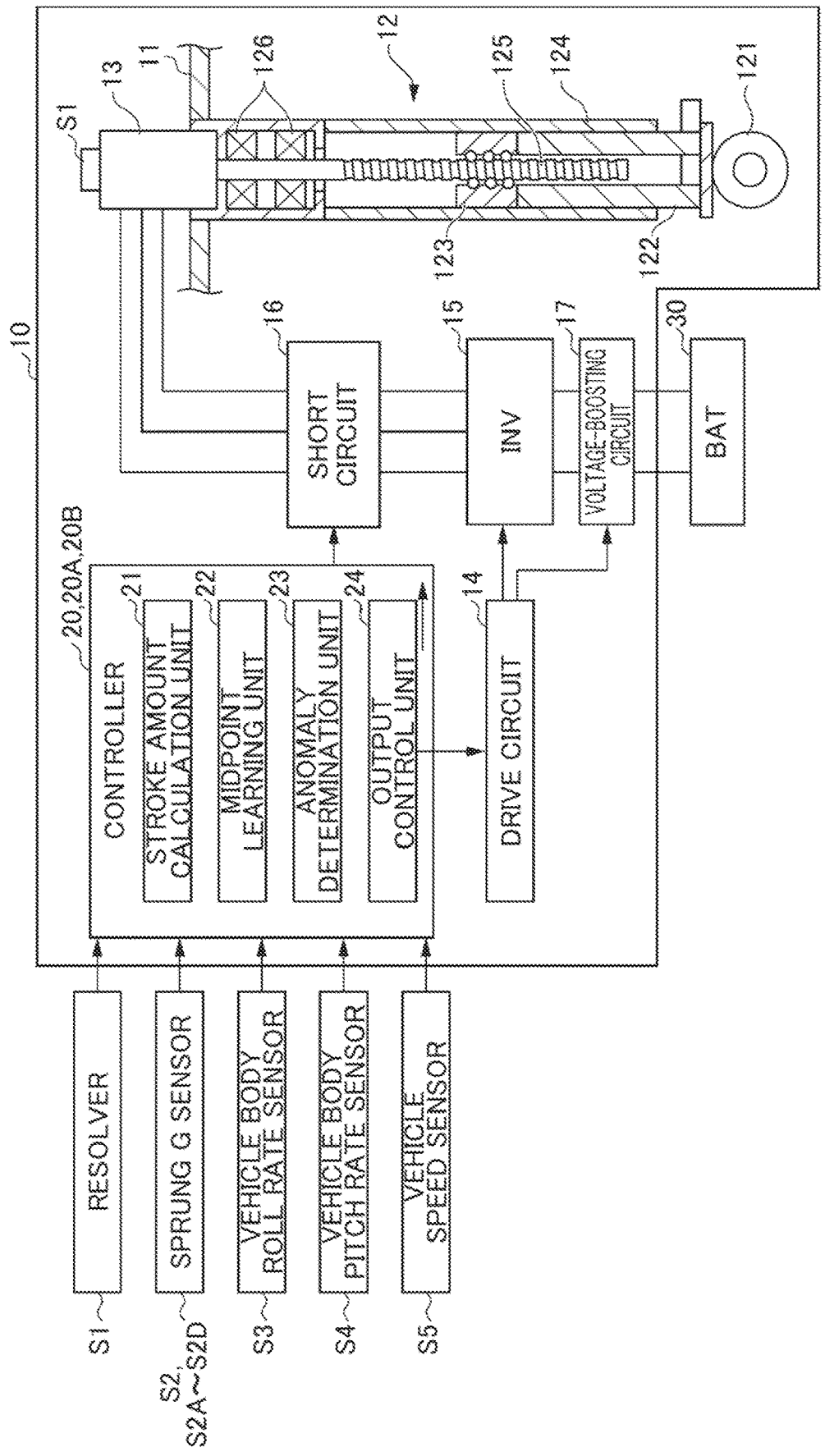
FIG. 2 is a block diagram that illustrates a configuration of the electric suspension apparatus according to the embodiment of the present invention.

With reference to the drawings, description is given below in detail regarding an embodiment of the present invention. FIG. 1 is a view of a configuration of a vehicle 1 in which an electric suspension apparatus 10 according to an embodiment of the present invention is mounted. FIG. 2 is a view that illustrates a configuration of the electric suspension apparatus 10. The vehicle 1 according to the present embodiment indicates a gasoline vehicle. However, the vehicle 1 may be a diesel vehicle or an electric automobile (including a hybrid vehicle and a fuel cell vehicle).

As illustrated in FIG. 1, the vehicle 1 is provided with a vehicle body BD, four wheels TR, and the electric suspension apparatus 10. The electric suspension apparatus 10 includes electric actuators 12, motors 13, and a controller 20. The electric actuators 12, the motors 13, and the controller 20 configure an electric suspension.

The electric actuators 12 are configured by a first actuator 12A, a second actuator 12B, a third actuator 12C, and a fourth actuator 12D, which correspond to the four wheels TR. The first actuator 12A is disposed between the vehicle body BD and a right-side front wheel. The second actuator 12B is disposed between the vehicle body BD and a left-side front wheel. The third actuator 12C is disposed between the vehicle body BD and a right-side rear wheel. The fourth actuator 12D is disposed between the vehicle body BD and a left-side rear wheel.

Each of the first actuator 12A through the fourth actuator 12D has approximately the same configuration. Accordingly, it may be that the first actuator 12A through the fourth actuator 12D are referred to below simply as an electric actuator 12 in a case where there is no need to distinguish them.

Next, with reference to FIG. 2, description is given regarding a configuration of an electric actuator 12. As illustrated in FIG. 2, the electric actuator 12 is provided with a connection section 121, an inner cylinder 122, and a ball screw nut 123 as members on a wheel TR side. The electric actuator 12 is also provided with an outer cylinder 124, a ball screw shaft 125, and bearings 126 as members on the vehicle body BD side. A motor 13 is disposed on the vehicle body BD side, similarly to the members in the electric actuator 12 that are on the vehicle body BD side. The outer cylinder 124 and the bearings 126 are secured to a chassis 11 disposed in the lower section of the vehicle body BD.

The ball screw shaft 125 is supported by the bearings 126 and the ball screw nut 123. The inner surface of the ball screw nut 123 screws together, via bearings, with thread grooves formed on the outer surface of the ball screw shaft 125. The ball screw shaft 125 is coaxially connected to a rotary shaft of the motor 13. The motor 13 causes the ball screw shaft 125 to rotate to thereby causes the ball screw nut 123 to move in an up-down direction. By the ball screw nut 123 moving downward, the inner cylinder 122 moves downward. By the ball screw nut 123 moving upward, the inner cylinder 122 moves upward. In this manner, a stroke amount (stroke position) in the up-down direction for the inner cylinder 122 with respect to the outer cylinder 124, which is secured to the chassis 11 belonging to the vehicle body BD, is adjusted.

The connection section 121 is secured to a knuckle (not illustrated) in the suspension apparatus to thereby be connected to the wheel TR. The electric actuator 12 performs a stroke operation in response to behavior by the wheel TR when the vehicle 1 is traveling. In other words, when vibration with respect to the connection section 121 is inputted from the wheel TR side when the vehicle 1 is traveling, acceleration is applied to the connection section 121. When upward acceleration is applied to the connection section 121, the inner cylinder 122 and the ball screw nut 123 rise. When downward acceleration is applied to the connection section 121, the inner cylinder 122 and the ball screw nut 123 descend. When the inner cylinder 122 and the ball screw nut 123 in the electric actuator 12 rise or descend, in conjunction therewith, the motor 13 causes the ball screw shaft 125 to rotate in a direction for absorbing the upward acceleration (direction for compressing the electric actuator 12) or in a direction for absorbing the downward acceleration (direction for pulling the electric actuator 12). As a result, vibration transmitted from the wheel TR to the vehicle body BD is damped.

A resolver S1 is disposed on the electric actuator 12. The resolver S1 is an example of a rotation angle sensor for detecting the angle of rotation (electrical angle) of the motor 13 for the electric actuator 12. Note that detection of the angle of rotation of the motor 13 for the electric actuator 12 is not limited to the resolver S1 and, for example, another rotation angle sensor such as a rotary encoder may be used. Such a rotation angle sensor is typically installed in a case of a three-phase alternating-current brushless motor.

As illustrated in FIG. 1 and FIG. 2, sprung G sensors S2 for detecting sprung acceleration by the vehicle body BD, a vehicle body roll rate sensor S3 for detecting an angular velocity for which a forward-backward direction of the vehicle body BD is set as a rotation axis, a vehicle body pitch rate sensor S4 for detecting an angular velocity for which a left-right direction of the vehicle body BD is set as a rotation axis, and a vehicle speed sensor S5 for detecting a vehicle speed are respectively provided on the vehicle body BD. The sprung G sensors S2 include a first sprung G sensor S2A that corresponds to the first actuator 12A, a second sprung G sensor S2B that corresponds to the second actuator 12B, a third sprung G sensor S2C that corresponds to the third actuator 12C, and a fourth sprung G sensor S2D that corresponds to the fourth actuator 12D. Each detection value from the resolver S1, the sprung G sensors S2, the vehicle body roll rate sensor S3, the vehicle body pitch rate sensor S4, and the vehicle speed sensor S5 is inputted to the controller 20. The resolver S1, the sprung G sensors S2, the vehicle body roll rate sensor S3, the vehicle body pitch rate sensor S4, and the vehicle speed sensor S5 all function as vibration detection sensors that detect vibration of the vehicle 1, and correspond to vibration detection sensors that detect vibration of the vehicle 1 in the present embodiment.

The controller 20 is configured by an electronic control unit (ECU), and controls each motor 13 for the first actuator 12A through the fourth actuator 12D. The controller 20 is electrically connected, via wiring, to each motor 13 for the first actuator 12A through the fourth actuator 12D.

Predetermined electric power is respectively supplied from a battery 30 to the controller 20 and each motor 13 for the first actuator 12A through the fourth actuator 12D. Based on detection results from the resolver S1, the sprung G sensors S2, the vehicle body roll rate sensor S3, the vehicle body pitch rate sensor S4, and the vehicle speed sensor S5, the controller 20 controls each motor 13 for the first actuator 12A through the fourth actuator 12D via an inverter 15.

As illustrated in FIG. 2, the controller 20 is provided with a memory 20A and a processor 20B, and controls the motors 13 for the electric actuators 12 via an inverter 31. The memory 20A is a storage apparatus that stores, in a non-volatile manner, data or a program that is executed by the processor 20B. The memory 20A is configured by a magnetic storage apparatus, a semiconductor storage element such as a flash ROM (read-only memory), or another type of non-volatile storage apparatus. The memory 20A may include a random-access memory (RAM) that configures a work area for the processor 20B. The memory 20A stores data that is processed by the controller 20, or a control program that the processor 20B executes. The processor 20B may be configured by a single processor, or functionality for the processor 20B may be configured by a plurality of processors. The processor 20B controls each unit in the electric suspension apparatus 10 by executing the control program. However, configuration may be taken such that the control program is stored in, inter alia, an external HDD that is not illustrated, and is read out therefrom.

The controller 20 includes a stroke amount calculation unit 21, a midpoint learning unit 22, an anomaly determination unit 23, and an output control unit 24. Specifically, the processor 20B in the controller 20 executes the control program, whereby the controller 20 executes various functionality belonging to the stroke amount calculation unit 21, the midpoint learning unit 22, the anomaly determination unit 23, and the output control unit 24.

Based on a detection value for the angle of rotation (electrical angle) of the motor 13 for the electric actuator 12 and inputted from the resolver S1, the stroke amount calculation unit 21 calculates a stroke amount for the electric actuator 12, which performs a stroke in response to behavior by the vehicle 1. This stroke amount represents a stroke position for the electric actuator 12. Because the rotary shaft in the motor 13 is coaxially connected to the ball screw shaft 125, the stroke amount for the electric actuator 12 is also a rotation amount of the ball screw shaft 125, which rotates in conjunction with up/down movement by the inner cylinder 122 and the ball screw nut 123.

The midpoint learning unit 22 obtains a stroke position of the electric actuator 12 when the vehicle speed=0 km/h, in other words when the vehicle 1 is in a stationary state. A midpoint is a stroke position for when a stroke operation by the electric actuator 12 is stopped while the vehicle 1 is in the stationary state. In a case where a detection value from the vehicle speed sensor S5 indicates that the vehicle speed=0 km/h, the controller 20 determines the presence or absence of vibration of the vehicle 1, based on each detection value inputted from the resolver S1, the sprung G sensors S2, the vehicle body roll rate sensor S3, and the vehicle body pitch rate sensor S4. Upon detecting that the vehicle 1 is in the stationary state, the controller 20 sets the stroke position of the electric actuator 12 at that time to the midpoint. When a stroke operation stops, the stroke position of the electric actuator 12 stops after returning to near the midpoint in accordance with action by a suspension spring. This midpoint can change in response to, inter alia, a number of occupants or an amount of loaded cargo.

The anomaly determination unit 23 determines whether the stroke amount that is for the electric actuator 12 and is calculated by stroke amount calculation unit 21 is greater than a predetermined upper limit (an upper-limit threshold) and or is less than a predetermined lower limit (a lower-limit threshold), in other words whether the stroke amount is greater than the predetermined upper limit (upper-limit threshold) and there is stroking on the pulling side and whether the stroke amount is less than the predetermined lower limit (lower-limit threshold) and there is stroking on the compression side.

In response to a determination result by the anomaly determination unit 23, the output control unit 24 performs output control with respect to the electric actuator 12, and controls operation by the vehicle 1 including operation by the electric actuator 12. Specifically, in a case where it is determined in the anomaly determination unit 23 that the stroke amount for the electric actuator 12 has exceeded the predetermined upper limit (upper-limit threshold) or is less than the predetermined lower limit (lower-limit threshold), the controller 20 uses the output control unit 24 to perform, inter alia, control for stopping operation by the electric actuator 12 and control for limiting the vehicle speed.

The controller 20, via the drive circuit 14, controls the inverter 15, a short circuit 16, and a voltage-boosting circuit 17. When stopping operation by the motor 13 for the electric actuator 12, the controller 20, via the drive circuit 14 and the short circuit 16, causes a three-phase line in the motor 13 to short-circuit to thereby cause an electromagnetic brake to act, and thus cause operation by the motor 13 for the electric actuator 12 to stop.

Figure 3:
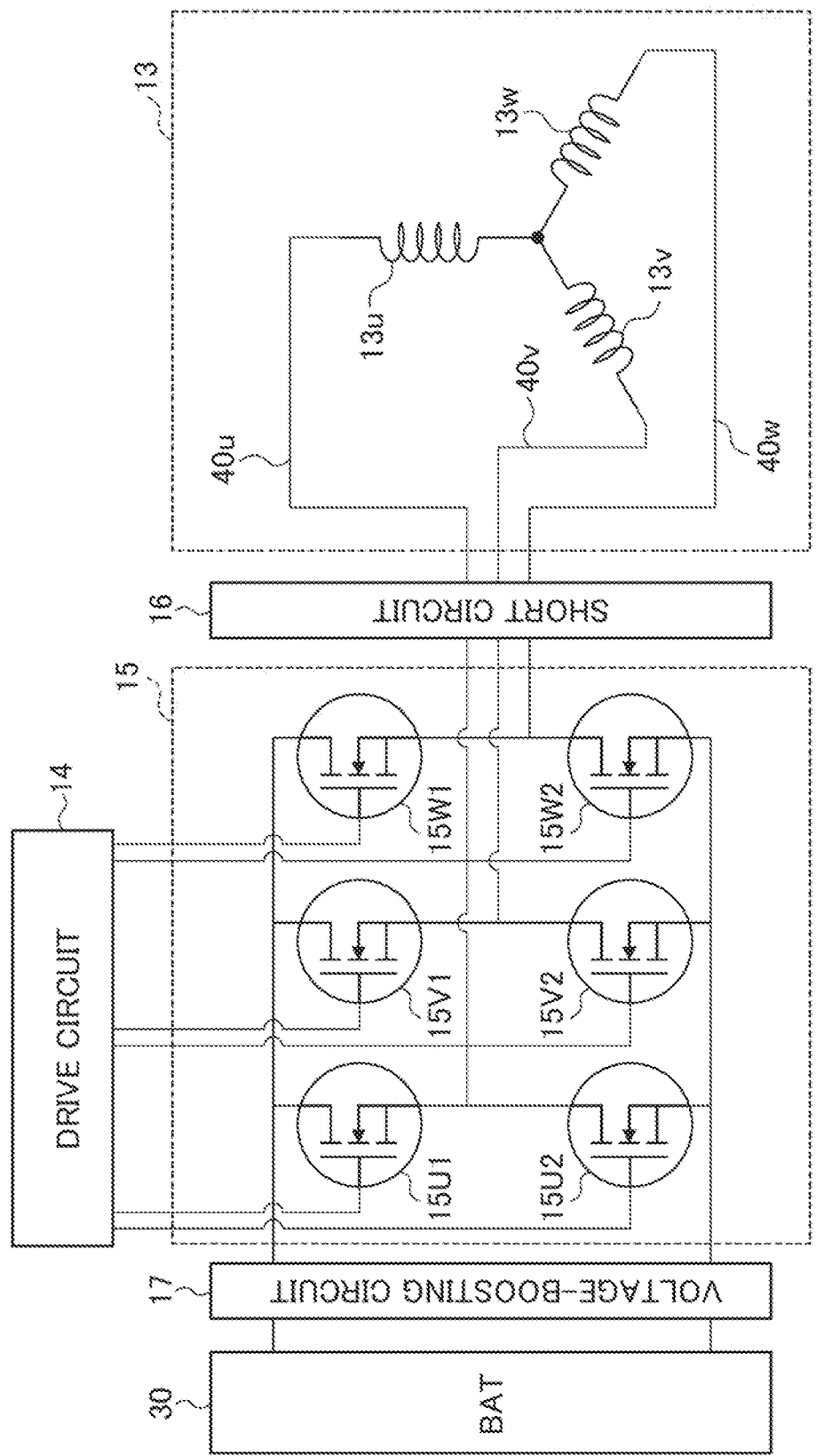
FIG. 3 is a view that illustrates an example of a configuration of an inverter in the electric suspension apparatus according to the embodiment of the present invention.

As illustrated in FIG. 2 and FIG. 3, the controller 20 controls the inverter 15 via a drive circuit 14. The controller 20 controls a rotation direction and a rotation speed for the motor 13, via the inverter 15. In addition, the controller 20, for example, causes supply of electric power to the motor 13 to stop by turning off the inverter 15. It may be that a relay is provided on the power supply line for the inverter 15 or the voltage-boosting circuit 17, and the controller 20 cuts off the relay to thereby stop the supply of electric power to the motor 13.

FIG. 3 is a view that illustrates an example of a configuration of the inverter 15. The voltage-boosting circuit 17 is disposed between the battery 30 and the inverter 15. The voltage-boosting circuit 17 boosts the voltage supplied from the battery 30 before supplying electric power to the inverter 15.

As illustrated in FIG. 3, the inverter 15 (a portion of a drive element) is provided with a metal-oxide-semiconductor field-effect transistor (MOSFET) 15U1, a MOSFET 15U2, a MOSFET 15V1, a MOSFET 15V2, a MOSFET 15W1, and a MOSFET 15W2. Each of these six MOSFETs is turned on or off, based on an instruction from the controller 20.

The motor 13 is, for example, a three-phase alternating-current brushless motor and is provided with three motor coils: a motor coil 13u, a motor coil 13v, and a motor coil 13w as illustrated in FIG. 3. The motor 13 rotationally drives the ball screw shaft 12S illustrated in FIG. 2 in accordance with the electric power supplied from the battery 30 via the inverter 15.

The drive circuit 14, in a case of having received an instruction to stop the supply of electric power to the motor 13 from the output control unit 24 in the controller 20, turns off the three plus-side MOSFETs, in other words the MOSFET 15U1, the MOSFET 15V1, and the MOSFET 15W1, for example. The MOSFET 15U1, the MOSFET 15V1, and the MOSFET 15W1 are turned off, whereby an electric power line 40u, an electric power line 40v, and an electric power line 40w are released from the voltage-boosting circuit 17. As a result, the application of voltage to the motor coil 13u, the motor coil 13v, and the motor coil 13w in the motor 13 is stopped.

The controller 20 causes the motor 13 to short-circuit via the short circuit 16. The short circuit 16 is provided with a switch (not illustrated) that turns on and off in accordance with an instruction from the controller 20, and a resistor (not illustrated). In accordance with an instruction from the output control unit 24, the switch in the short circuit 16, for example, short-circuits the electric power line 40u and the electric power line 40v, which respectively correspond to the motor coil 13u and the motor coil 13v. In the above-described case, when the switch has short-circuited the electric power line 40u and the electric power line 40v, the resistor in the short circuit 16 adjusts the current flowing to the motor coil 13u and the motor coil 13v. Similarly, the electric power line 40v and the electric power line 40w are short-circuited, whereby it is possible to realize a three-phase short-circuit state for the motor coils 13u, 13v, and 13w.

Figure 4:
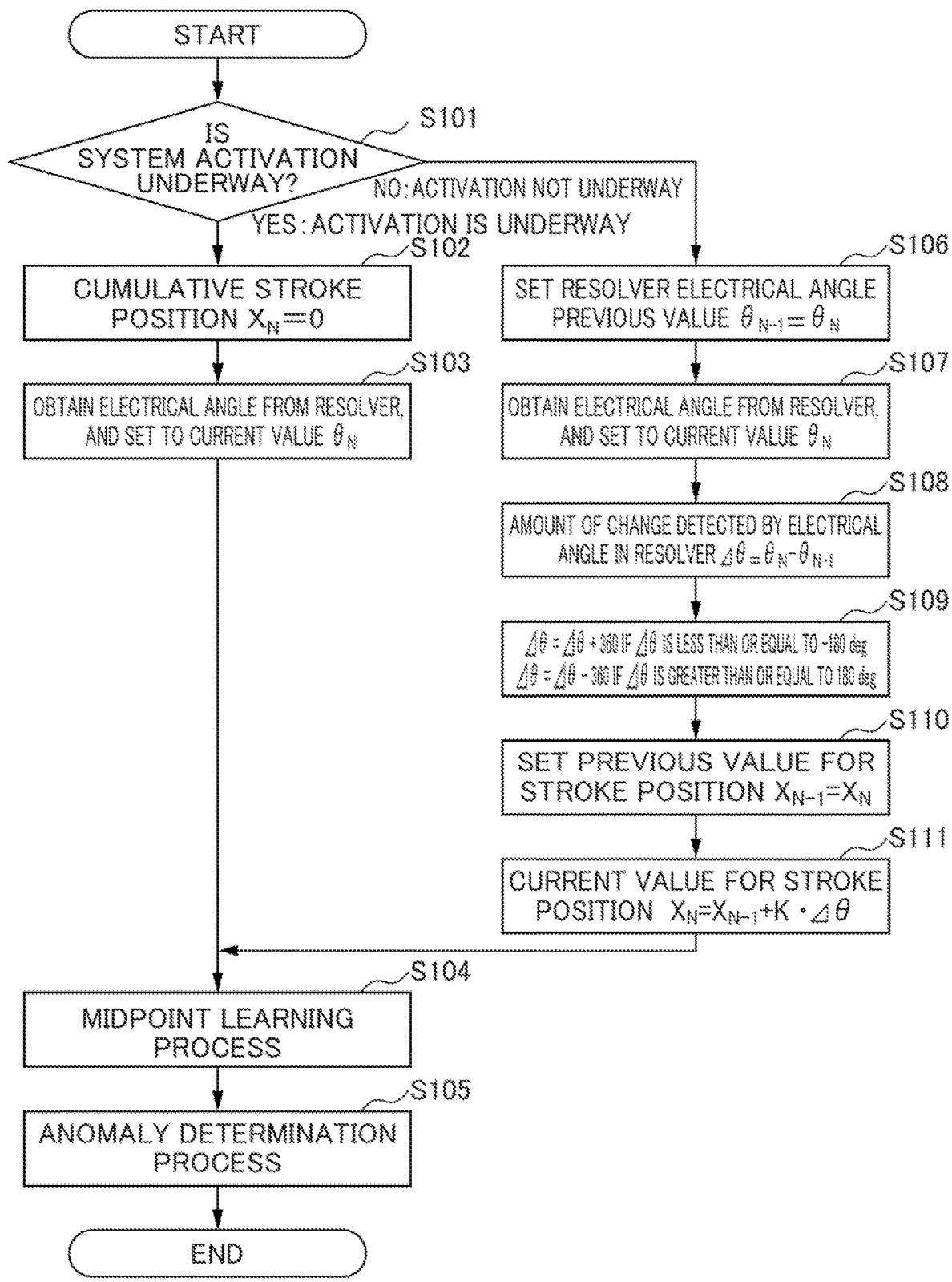
FIG. 4 is a flow chart that illustrates an example of control of an electric suspension in the electric suspension apparatus according to the embodiment of the present invention.

Description is given below regarding a method for controlling an electric suspension for the purpose of determining an anomaly, using the electric suspension apparatus 10 configured as described above. FIG. 4 is a flow chart that illustrates an example of control of an electric suspension in the electric suspension apparatus 10 according to the present embodiment. The following process is executed with respect to each motor 13 for the four of the first actuator 12A through the fourth actuator 12D belonging to the electric suspension apparatus 10. However, in order to simplify the description, description is given for an example of a process for the motor 13 for one electric actuator 12.

Firstly, in step S101, the controller 20 determines whether system activation is underway for the electric suspension apparatus 10 after an ignition in the vehicle 1 has been turned on. In a case where it is determined that system activation is underway (step S101: YES), the process transitions to step S102 and, during activation of the electric actuator 12, the controller 20 sets a stroke amount (a cumulative stroke position $X_N$) to a fixed initial value, in the stroke amount calculation unit 21. Here, the cumulative stroke position $X_N=0$ is set, but the fixed initial value may also be any value other than zero. The stroke amount is set to a fixed initial value during system activation in this manner, whereby the controller 20 can simplify calculation control because there is no handover of a previous final value when calculating the stroke amount in the stroke amount calculation unit 21.

Next, in step S103, the controller 20 obtains a detection value for the angle of rotation (electrical angle) of the motor 13 from the resolver S1 disposed on the motor 13 for the electric actuator 12. The obtained detection value is set, as a current value ON, in the controller 20.

Figure 5:
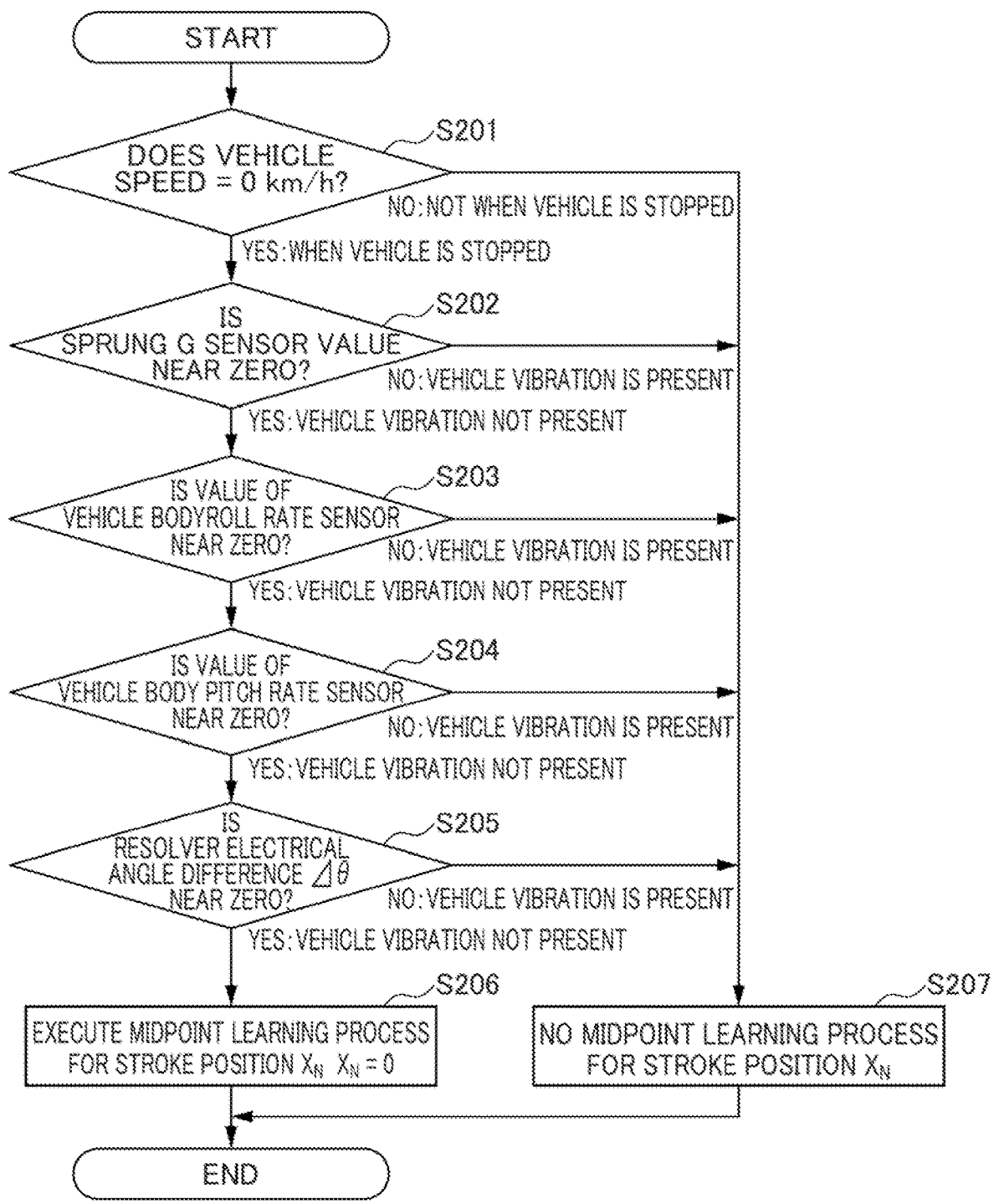
FIG. 5 is a flow chart that illustrates an example of a midpoint learning process for the electric suspension in the electric suspension apparatus according to the embodiment of the present invention.

Next, in step S104, the controller 20 uses the midpoint learning unit 22 to execute a midpoint learning process. A flow chart for this midpoint learning process is illustrated in FIG. 5.

In the midpoint learning process, in step S201, the controller 20 firstly determines from the detection value inputted from the vehicle speed sensor S5 whether the vehicle speed is 0 km/h, in other words whether the vehicle 1 is stopped. In a case where it is determined that the vehicle 1 is stopped (step S201: YES), the process transitions to step S202.

In step S202, the controller 20 determines whether the detection value inputted from the sprung G sensor S2 is near zero to thereby determine whether there is input of vibration to the vehicle 1. In a case where it is determined that the detection value is near zero and thus there is no input of vibration to the vehicle 1 (step S202: YES), the process transitions to step S203.

In step S203, the controller 20 determines whether the detection value inputted from the vehicle body roll rate sensor S3 is near zero to thereby further determine whether there is input of vibration to the vehicle 1. In a case where it is determined that the detection value is near zero and thus there is no input of vibration to the vehicle 1 (step S203: YES), the process transitions to step S204.

In step S204, the controller 20 determines whether the detection value inputted from the vehicle body pitch rate sensor S4 is near zero to thereby further determine whether there is input of vibration to the vehicle 1. In a case where it is determined that the detection value is near zero and thus there is no input of vibration to the vehicle 1 (step S204: YES), the process transitions to step S205.

In step S205, the controller 20 detects whether a difference $\Delta\theta$ in the angle of rotation (electrical angle) inputted from the resolver S1 is near zero, in other words detects whether the motor 13 is not rotating in both of the forward and reverse directions to thereby further determine whether there is input of vibration to the vehicle 1. In a case where it is determined that the difference $\Delta\theta$ is near zero and thus there is no input of vibration to the vehicle 1 (step S205: YES), the process transitions to step S206.

In step S206, the controller 20 determines that there is no vibration of the vehicle 1, executes the midpoint learning process, and sets the stroke amount (the cumulative stroke position $X_N$) for during activation of the electric actuator 12 to a midpoint. Here, the $X_N=0$ set in step S102 indicated in FIG. 4 is set to the midpoint. During system activation, in other words when the ignition is turned on, various numbers of occupants and amounts of loaded cargo in the vehicle 1 are envisioned. Therefore, the controller 20 can calculate an accurate stroke amount for the electric actuator 12, corresponding to situational changes for the numbers of occupants and the amounts of loaded cargo.

The process transitions to step S207 in a case where it is determined that the vehicle 1 is not stopped in step S201, and in a case where it is determined that there is input of vibration to the vehicle 1 in any of steps S202, S203, S204, and S205 (steps S202 through S205: NO). In step S207, the controller 20 ends the midpoint learning process in the midpoint learning unit 22, and causes the processing to transition to a step in the subsequent anomaly determination process.

Note that thresholds for determining whether the detection values from each of the above sensors S2 through S4 is near zero are defined to ranges at which it can be typically considered that the electric actuator 12 is not operating. It is possible to consider a value at a level of sensor noise to be near zero. The presence or absence of input of vibration to the vehicle 1 may be determined from at least one detection value from among the sensors S1 through S5. The presence or absence of input of vibration to the vehicle 1 does not need to be determined from all detection values from the sensors S1 through S5, and may be set, as appropriate, in accordance with types of sensors mounted to the vehicle 1.

The midpoint learning process do not need to be executed in a case where there is no input of vibration to the vehicle 1 (step S201 through S205: YES). For example, the processing in steps S201 through S205 is repeated while an amount of determination time in which it is possible to learn the midpoint is counted by a timer within the controller 20. The midpoint learning process may be executed in a case where it is determined that there is no input of vibration to the vehicle 1 even though the count value has continued for a preset predetermined amount of time. The midpoint in this case is set to the fixed value (for example, 0) set in step S102 indicated in FIG. 4. As a result, the midpoint being frequently set is suppressed, and simplifying control is addressed. The controller 20 may count a number of times that there being no input of vibration to the vehicle 1 is determined in place of counting a predetermined amount of time by a timer. In other words, in a case where the controller 20 has determined that it is determined that there is no input of vibration to the vehicle 1 having continued for a preset predetermined number of times, simplification of control is addressed similar to the above even if the controller 20 executes the midpoint learning process, whereby the controller 20 sets the midpoint to the fixed value (for example, 0) set in step S102 indicated in FIG. 4.

Figure 6:
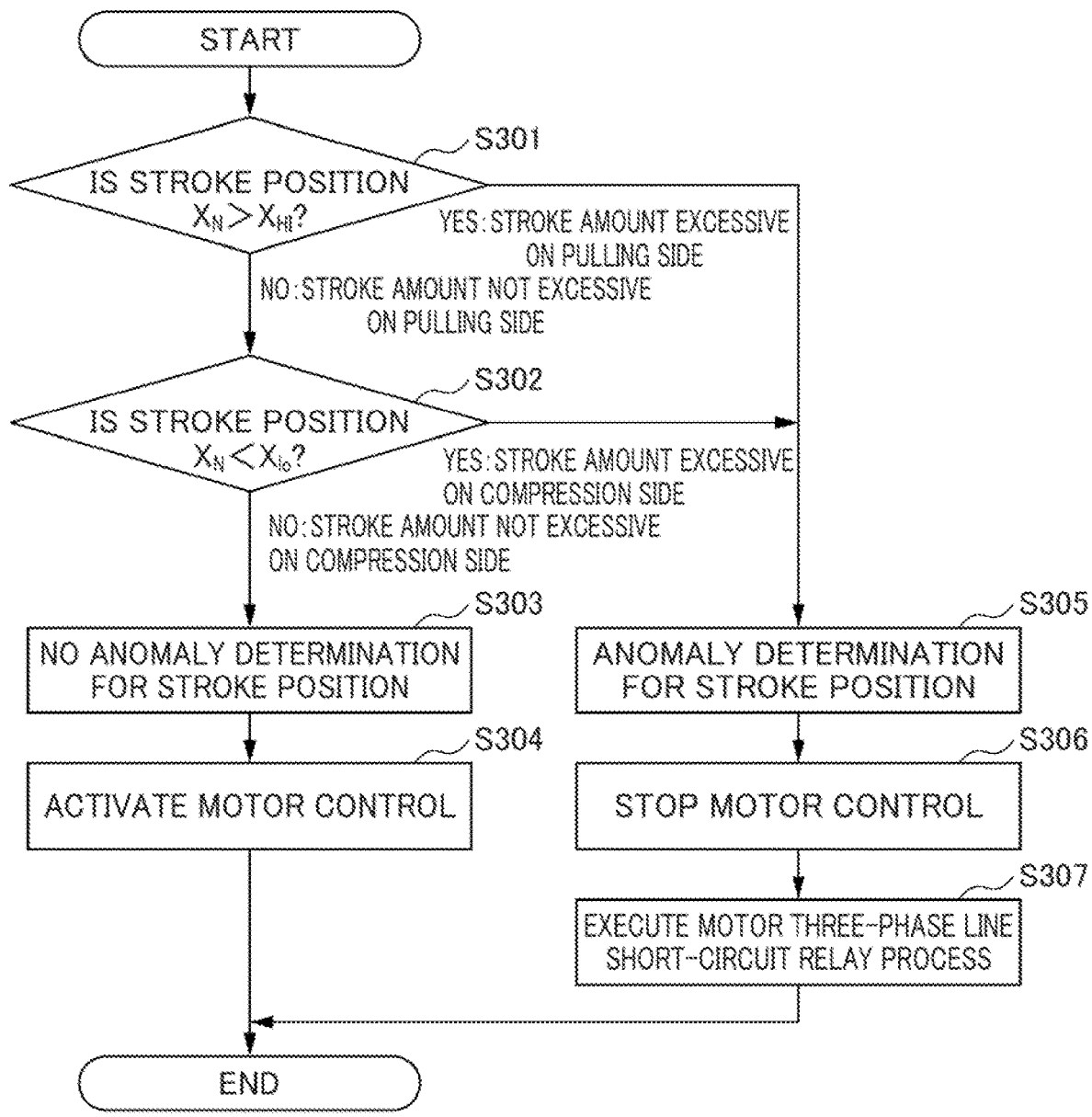
FIG. 6 is a flow chart that illustrates an example of an anomaly determination process for the electric suspension in the electric suspension apparatus according to the embodiment of the present invention.

Returning to FIG. 4, after the midpoint learning process in step S104, the processing transitions to an anomaly determination process in step S105. As a result, the controller 20 performs an anomaly determination for the electric actuator 12 in the anomaly determination unit 23 while the vehicle 1 is traveling. FIG. 6 illustrates a flow chart for this anomaly determination process.

In the anomaly determination process, in step S301, the controller 20 firstly determines whether a stroke amount (stroke position $X_N$) which is from the midpoint for the electric actuator 12 and is calculated from the detection value from the resolver S1 is greater than a preset upper-limit threshold $X_{Hi}$. In a case where it is determined that the stroke amount (stroke position $X_N$) is not exceeding the upper-limit threshold $X_{Hi}$ (step S301: NO), it is determined that the stroke amount is not excessive on the pulling side. Subsequently, the process transitions to step S302.

In step S302, the controller 20 determines whether the stroke amount (stroke position $X_N$) which is from the midpoint for the electric actuator 12 and is calculated from the detection value from the resolver S1 is less than a preset lower-limit threshold $X_{Lo}$. In a case where it is determined that the stroke amount (stroke position $X_N$) is not less than the lower-limit threshold $X_{Lo}$ (step S302: NO), it is determined that the stroke amount is not excessive on the compression side. Subsequently, the process transitions to step S303.

In step S303, the controller 20 decides that there is no anomaly determination for the stroke amount (stroke position) of the electric actuator 12 and, in the subsequent step S304, the controller 20 decides to enable control of the motor 13. Accordingly, operation control of the electric actuator 12 is continued.

Meanwhile, in a case where it is determined in step S301 that the stroke amount (stroke position $X_N$) from the midpoint is greater than the upper-limit threshold $X_{Hi}$ and that the stroke amount is excessive on the pulling side (step S301: YES) or in a case where it is determined in step S302 that the stroke amount (stroke position $X_N$) from the midpoint is less than the lower-limit threshold $X_{Lo}$ and that the stroke amount is excessive on the compression side (step S302: YES), the process transitions to step S305.

In step S305, the controller 20 determines that there is an anomaly in the stroke amount of the electric actuator 12 and, in the subsequent step S306, the controller 20 decides to stop control of the motor 13. Subsequently, in step S307, the controller 20, in the output control unit 24, controls the short circuit 16 via the drive circuit 14 and the inverter 15, and executes a short-circuit relay process for the motor three-phase lines to thereby forcibly cause the motor 13 to stop. When the motor 13 is stopped, a warning (including a warning sound) is displayed on, inter alia, an instrument panel within the vehicle 1, for example. As a result, malfunction by the electric actuator 12 is prevented. However, in a case where a physical failure has occurred in the electric actuator 12, configuration may be taken to, when the controller 20 has been able to diagnose the degree of the failure that has occurred, use the electric actuator 12 within a necessary minimum range, in response to the degree of the failure.

Note that process for stopping motor control is continued until the ignition in the vehicle 1 is turned off. In this duration, a warning (including a warning sound) is continuously displayed on, inter alia, the instrument panel within the vehicle 1. In addition, it may be that the warning (including a warning sound) is continued to be displayed even if the ignition in the vehicle 1 is turned on again after the ignition is turned off.

The upper-limit threshold $X_{Hi}$ and the lower-limit threshold $X_{Lo}$ for the stroke amount (stroke position $X_N$) of the electric actuator 12 can be set after taking into account a safety factor, if necessary, with reference to design values for an upper limit and lower limit for the stroke amount of the electric actuator 12. The upper-limit threshold $X_{Hi}$ and the lower-limit threshold $X_{Lo}$ are not limited to being set to the same stroke amount on the pulling side and the compression side with respect to the midpoint, and may be set to mutually different stroke amounts on the pulling side and the compression side.

In a case where the controller 20, in the anomaly determination unit 23, determines where the stroke amount (stroke position $X_N$) for any one of the four of the first actuator 12A through the fourth actuator 12D is greater than the upper-limit threshold $X_{Hi}$ or is less than the lower-limit threshold $X_{Lo}$, the controller 20, in the anomaly determination unit 23, may cause control of the motor 13 to stop even for the electric actuator 12 corresponding to another wheel TR adjacent to the left or right or to the front or rear of the wheel TR corresponding to this one electric actuator 12. This is because it is determined that there is a high possibility that a similar anomaly (failure) has occurred for the other electric actuator 12 which is not the electric actuator 12 for which the anomaly was determined. As a result, it is possible to reduce discomfort imparted to occupants because behavior by the vehicle 1 is stable in comparison to stopping control for the electric actuator 12 corresponding to only one wheel from among the four wheels TR.

In addition, in a case where the controller 20, in the anomaly determination unit 23, has determined that the stroke amount (stroke position) of the electric actuator 12 is greater than the upper-limit threshold $X_{Hi}$ or is less than or equal to the lower-limit threshold $X_{Lo}$, the controller 20, in the output control unit 24, may output a signal for limiting the vehicle speed to, inter alia, less than or equal to 60 km/h, for example. As a result, it is possible to improve safety when driving the vehicle 1.

Returning to FIG. 4, in a case where it is determined in step S101 that system activation is not underway (a state has been entered in which, in flow chart processing for one step previous, a value for a resolver electrical angle and a value for the stroke amount are already set and can be used as previous values) (step S101: NO), the process transitions to step S106. In step S106, the controller 20, in the stroke amount calculation unit 21, sets a detection value $\theta_N$ for the angle of rotation (electrical angle) in the resolver S1 to the previous value, in other words the previous detection value $\theta_{N-1}$.

Figure 7:
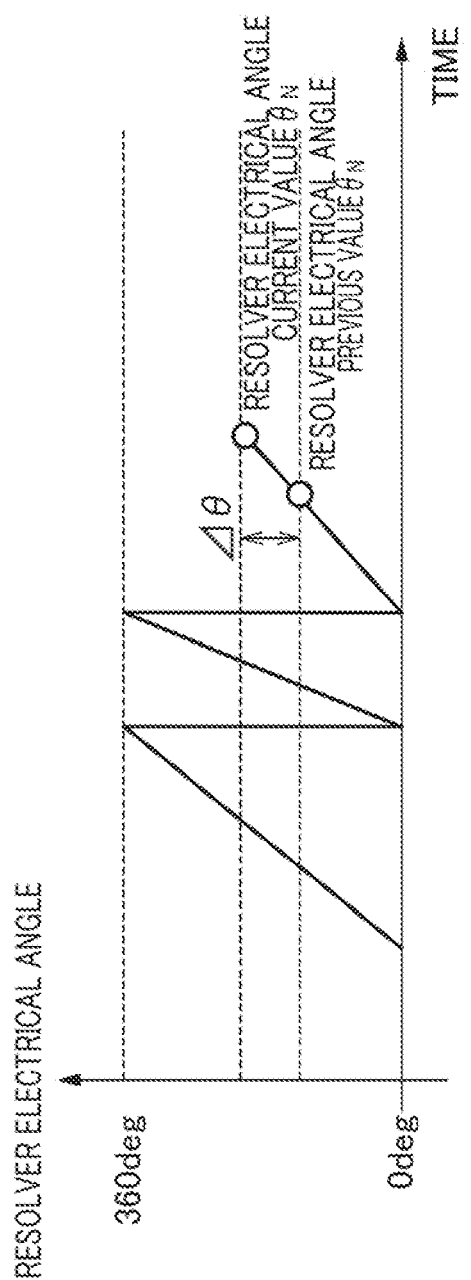
FIG. 7 is a view for describing an amount of change in a resolver electrical angle in the electric suspension apparatus according to the embodiment of the present invention.

Next, in step S107, the controller 20 sets the detection value $\theta_N$ for the angle of rotation (electrical angle) inputted from the resolver S1 as the current value. Subsequently, in step S108, the controller 20 calculates an amount of change in the angle of rotation (electrical angle) from the resolver S1. In other words, as illustrated in FIG. 7, when the electric actuator 12 performs a stroke operation, the detection value for the angle of rotation (electrical angle) from the resolver S1 changes between 0 to 360 deg. As the amount of change in the angle of rotation (electrical angle) from the resolver S1, the controller 20 calculate a difference $\Delta\theta=\theta_N-\theta_{N-1}$ between the current value $\theta_N$ and the previous value $\theta_{N-1}$, which is the previous detection value for the angle of rotation (electrical angle) from the resolver S1.

Next, in step S109, the controller 20 performs a spanning determination process for 360 deg and 0 deg. Specifically, the controller 20 sets $\Delta\theta=\Delta\theta+360$ in a case where the $\Delta\theta$ obtained in step S107 is less than or equal to −180 deg, and sets $\Delta\theta=\Delta\theta-360$ in a case where A is greater than or equal to 180 deg. Subsequently, in step S110, the controller 20 sets the previous value $X_{N-1}=X_N$, for the stroke amount (stroke position).

Next, in step S111, the controller 20 calculates the current value $X_N=X_{N-1}+K\cdot\Delta\theta$, for the stroke amount (stroke position) for the electric actuator 12. K is a coefficient and is defined from, inter alia, the number of electrode pairs in the motor 13 or the specification of the ball screw shaft 125. Subsequently, the processing transitions to processing from step S104 which is described above, and the controller 20 uses the midpoint learning unit 22 and the anomaly determination unit 23 to execute an anomaly determination process after a midpoint learning process.

By virtue of the electric suspension apparatus 10 and the method for controlling an electric suspension which are according to the present embodiment as above, generally a rotation angle sensor such as the resolver S1 which is disposed for the motor 13 for the electric actuator 12 is used to calculate the stroke amount (stroke position) for the electric actuator, and thus there is no need to additionally install, inter alia, a new sensor. Accordingly, the electric suspension apparatus 10 and the method for controlling an electric suspension which are according to the present embodiment can improve the accuracy of measuring the stroke amount (stroke position) for the electric actuator 12 while simplifying a system configuration for the electric suspension apparatus 10.

Incidentally, the flow chart illustrated in FIG. 4 is provided with the step S101 in which the controller 20 determines whether system activation is underway after the ignition in the vehicle 1 is turned on. However, as in a flow chart illustrated in FIG. 8, after the ignition in the vehicle 1 is turned on, the controller 20 may execute the processing in step S401 through step S408 without determining whether system activation is underway. In this case, when the ignition in the vehicle 1 is turned on, the controller 20 sets, as a value for the stroke amount (stroke position) for the electric actuator 12, a calculation value that is for the stroke amount at a previous system shutdown time and is a calculation value always calculated from an electrical angle detection value from the resolver S1 at a previous system shutdown time, and thus it is possible to improve the accuracy of calculating the stroke amount (stroke position).

Figure 8:
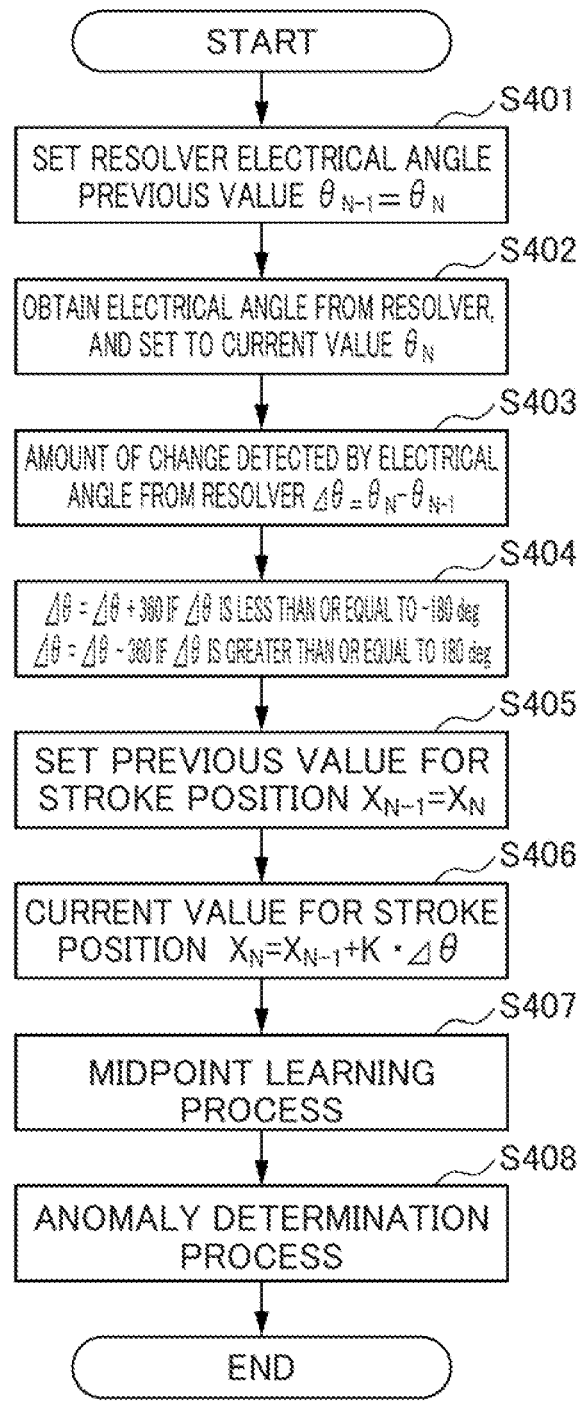
FIG. 8 is a flow chart that illustrates another example of a process for calculating a stroke amount for the electric suspension in the electric suspension apparatus according to the embodiment of the present invention.

Note that, in the flow chart illustrated in FIG. 8, step S401 through step S406, step S407, and step S408 have the same processing content as step S106 through step S111, step S104, and step S105 in the flow chart illustrated in FIG. 4, and thus the description thereof invokes the description for FIG. 4, and description here is omitted.

By virtue of the electric suspension apparatus 10 and the method for controlling the electric suspension apparatus 10, according to the present embodiment, the following effects are achieved.

The electric suspension apparatus 10 according to the present embodiment is an electric suspension apparatus that is mountable in the vehicle 1 and includes: the electric actuator 12 that performs a stroke operation in response to behavior by the vehicle 1; the motor 13 that drives the electric actuator 12; the resolver S1 which is a rotation angle sensor for detecting an angle of rotation of the motor 13; and the controller 20 that controls the electric actuator 12, the controller 20 calculating a stroke amount for the electric actuator 12 based on an amount of rotation angle change by the resolver S1, and controlling the electric actuator 12 based on the calculated stroke amount.

As a result, it is possible to use, unchanged, a rotation angle sensor such as the resolver S1 which is typically disposed for the motor 13 on the electric actuator 12 in order to calculate a stroke amount for the electric actuator 12, and therefore it is possible to improve the accuracy of measuring the stroke amount for the electric actuator 12 while simplifying or streamlining a system configuration for the electric suspension apparatus 10.

The controller 20 may, during activation of the electric suspension apparatus 10, set the stroke amount for the electric actuator 12 to a fixed initial value.

As a result, because there is no handover of a final value from during a previous system activation, it is possible to address simplification of control for the electric suspension apparatus 10.

The controller 20 may, during activation of the electric suspension apparatus 10, set the stroke amount for the electric actuator 12 to a value from when the electric suspension apparatus 10 previously shut down.

As a result, it is possible to improve the accuracy of calculating a stroke amount for the electric actuator 12.

It may be that a vibration detection sensor (at least one of the resolver S1, the sprung G sensor S2, the vehicle body roll rate sensor S3, the vehicle body pitch rate sensor S4, and the vehicle speed sensor S5) for detecting vibration of the vehicle 1 is also included, and the controller 20, in a case of determining that there is no vibration of the vehicle 1 based on a detection result from the vibration detection sensor, sets the stroke amount for the electric actuator 12 to a fixed value.

As a result, it is possible to handle a state change such as an increase or decrease of occupants or an amount of loaded cargo in the vehicle 1 after the system activation of the electric suspension apparatus 10, and thus it is possible to measure the stroke amount of the electric actuator 12 with higher accuracy.

The controller 20 may, in a case of determining over a predetermined number of times or a predetermined amount of time that there is no vibration of the vehicle 1 based on a detection result from the vibration detection sensor, set the stroke amount for the electric actuator 12 to the fixed value.

As a result, a fixed value being frequently set is suppressed, and thus it is possible to further simplify control for the electric suspension apparatus 10.

The controller 20 may stop control of the electric actuator 12 in a case where a calculated stroke amount is greater than a predetermined value (the upper-limit threshold $X_{Hi}$) or is less than a predetermined value (the lower-limit threshold $X_{Lo}$).

As a result, it is possible to prevent malfunction by the electric actuator 12.

It may be that the electric actuator 12 is provided for each of the plurality of wheels TR belonging to the vehicle 1, and the controller 20, in a case where, from among a plurality of the electric actuators (the first actuator 12A through the fourth actuator 12D), the stroke amount for the electric actuator 12 corresponding to one of the wheels TR is greater than a predetermined value (the upper-limit threshold $X_{Hi}$) or is less than a predetermined value (the lower-limit threshold $X_{Lo}$), stops control of the electric actuator 12 corresponding to a wheel TR adjacent to the one of the wheels TR or stops control of the electric actuators 12 corresponding to all of the wheels TR.

As a result, it is possible to reduce discomfort imparted to occupants because behavior by the vehicle 1 is stable in comparison to stopping control for the electric actuator 12 corresponding to only one wheel from among the plurality of wheels TR.

The controller 20 may output a signal for restricting vehicle speed in a case where the stroke amount for the electric actuator 12 is greater than a predetermined value (the upper-limit threshold $X_{Hi}$) or is less than a predetermined value (the lower-limit threshold $X_{Lo}$).

As a result, it is possible to improve safety when driving the vehicle 1.

A method that is for controlling an electric suspension and is according to the present embodiment is a method for controlling an electric suspension provided with an electric actuator 12 that is mountable in the vehicle 1 and is configured to perform a stroke operation in response to behavior by the vehicle 1, the method including: calculating a stroke amount for the electric actuator 12 based on an amount of rotation angle change by the resolver S1 which is a rotation angle sensor for detecting an angle of rotation of the motor 13 that drives the electric actuator 12, and controlling the electric actuator 12 based on the calculated stroke amount.

As a result, it is possible to use, unchanged, a rotation angle sensor such as the resolver S1 which is typically disposed for the motor 13 on the electric actuator 12 in order to calculate a stroke amount for the electric actuator 12, and therefore it is possible to improve the accuracy of measuring the stroke amount for the electric actuator 12 while simplifying or streamlining a system configuration for the electric suspension apparatus 10.

Units of processing in the flow charts illustrated in FIG. 4 through FIG. 6 and FIG. 7 are divided in accordance with main processing content in order to facilitate understanding pertaining to processing by the controller 20 in the electric suspension apparatus 10. The embodiment is not limited by the name or the manner of division of the units of processing illustrated in each flow chart. Processing by the controller 20 can be divided into more units of processing in accordance with processing content, and can be divided such that one unit of processing includes more processing. The processing orders in the flow charts described above are not limited to the examples that were illustrated.

A method for controlling the electric suspension apparatus 10 using the controller 20 can be realized by causing the processor 20B in the controller 20 to execute a control program that corresponds to a method for controlling the controller 20. The control program can be recorded to a recording medium to which recording has been performed in a manner that enables reading by a computer. It is possible to use a magnetic or optical recording medium, or a semiconductor memory device for the recording medium. Specifically, a fixed or a portable recording medium, such as a floppy disk, a CD-ROM (Compact Disc Read-Only Memory), a DVD (Digital Versatile Disc), a Blu-ray (registered trademark) disc, a magneto-optical disk, a flash memory, or a card type recording medium may be given. The recording medium may be a non-volatile storage apparatus such as a RAM, ROM, or HDD, the non-volatile storage apparatus being an internal storage apparatus that the electric suspension apparatus 10 is provided with. The control program which corresponds to a method for controlling the electric suspension apparatus 10 using the controller 20 can be stored on, inter alia, a server apparatus, and downloaded from the server apparatus to the controller 20 to thereby realize a method for controlling the controller 20.

EXPLANATION OF REFERENCE NUMERALS

1 Vehicle
10 Electric suspension apparatus
12 Electric actuator
13 Motor
20 Controller
S1 Resolver (rotation angle sensor, vibration detection sensor)
S2, S2A through S2D Sprung G sensor (vibration detection sensor)
S3 Vehicle body roll rate sensor (vibration detection sensor)
S4 Vehicle body pitch rate sensor (vibration detection sensor)
S5 Vehicle speed sensor
TR Wheel
$X_{Hi}$ Upper-limit threshold
$X_{Lo}$ Lower-limit threshold

What is claimed is:

1. An electric suspension apparatus mountable in a vehicle, comprising:
   an electric actuator disposed between each of a plurality of wheels provided on the vehicle and a vehicle body, the electric actuator configured to perform a stroke operation in response to behavior by the vehicle;
   a motor configured to drive the electric actuator;

a rotation angle sensor configured to detect an angle of rotation of the motor; and a controller configured to control the electric actuator, wherein the controller calculates a stroke amount for the electric actuator based on an amount of change in the rotation angle detected by the rotation angle sensor, and controls the electric actuator based on the calculated stroke amount.

2. The electric suspension apparatus according to claim 1, wherein, during activation of the electric suspension apparatus, the controller sets the stroke amount for the electric actuator to a fixed initial value.

3. The electric suspension apparatus according to claim 1, wherein, during activation of the electric suspension apparatus, the controller sets the stroke amount for the electric actuator to a value from when the electric suspension apparatus previously shut down.

4. The electric suspension apparatus according to claim 1, further comprising:

a vibration detection sensor configured to detect vibration of the vehicle, wherein the controller, in a case of determining that there is no vibration of the vehicle based on a detection result from the vibration detection sensor, sets the stroke amount for the electric actuator to a fixed value.

5. The electric suspension apparatus according to claim 4, wherein the controller, in a case of determining over a predetermined number of times or a predetermined amount of time that there is no vibration of the vehicle based on a detection result from the vibration detection sensor, sets the stroke amount for the electric actuator to the fixed value.

6. The electric suspension apparatus according to claim 1, wherein the controller, in a case where the calculated stroke amount is greater than a predetermined upper limit or is less than a predetermined lower limit, stops control of the electric actuator.

7. The electric suspension apparatus according to claim 6, wherein the electric actuator is provided on each of a plurality of the wheels belonging to the vehicle, and the controller, in a case where, from among a plurality of the electric actuators, the stroke amount for the electric actuator corresponding to one of the wheels is greater than the predetermined upper limit or is less than the predetermined lower limit, stops control of the electric actuator corresponding to the wheel adjacent to the one of the wheels or stops control of the electric actuators corresponding to all of the wheels.

8. The electric suspension apparatus according to claim 6, wherein the controller outputs a signal for limiting a vehicle speed in a case where the stroke amount for the electric actuator is greater than the predetermined upper limit or is less than the predetermined lower limit.

9. A method for controlling an electric suspension provided with an electric actuator that is disposed between each of a plurality of wheels provided on the vehicle and a vehicle body, the electric actuator is configured to perform a stroke operation in response to behavior by the vehicle, the method comprising:

calculating a stroke amount for the electric actuator based on an amount of change in the rotation angle detected by the rotation angle sensor for detecting an angle of rotation of a motor that drives the electric actuator; and controlling the electric actuator based on the calculated stroke amount.

* * * * *